United States Patent [19]
Maner

[11] Patent Number: 5,240,587
[45] Date of Patent: Aug. 31, 1993

[54] METHOD OF PRODUCING A FILTER MATERIAL

[75] Inventor: Asim Maner, Kerns, Switzerland

[73] Assignee: Maxs AG, Switzerland

[21] Appl. No.: 908,479

[22] Filed: Jul. 6, 1992

[30] Foreign Application Priority Data

Jul. 17, 1991 [DE] Fed. Rep. of Germany ....... 4123708

[51] Int. Cl.⁵ ............................................... C25D 1/08
[52] U.S. Cl. ....................................................... 205/75
[58] Field of Search ........................................... 205/75

[56] References Cited
U.S. PATENT DOCUMENTS 4,575,406 3/1986 Slafer ..................................... 204/11

FOREIGN PATENT DOCUMENTS 0272764 6/1988 European Pat. Off. .
1-16279 10/1989 Japan .

Primary Examiner—T. M. Tufariello
Attorney, Agent, or Firm—Christie, Parker & Hale

[57] ABSTRACT

The present invention relates to a method of producing a filter material and to a filter material produced by the described method. The method comprises the steps of providing a substrate and forming an electrically conductive structure on the substrate. Electrical insulating, fiber-like flock rods are then anchored to the substrate. A metal layer is then formed over the substrate and around the flock rods by electrodepositing. The substrate is separated from the electrodeposited metal layer and the flock rods are removed from the electrodeposited metal layer to produce a metal filter with microapertures traversing the thickness of the filter.

8 Claims, 3 Drawing Sheets

FIG.2
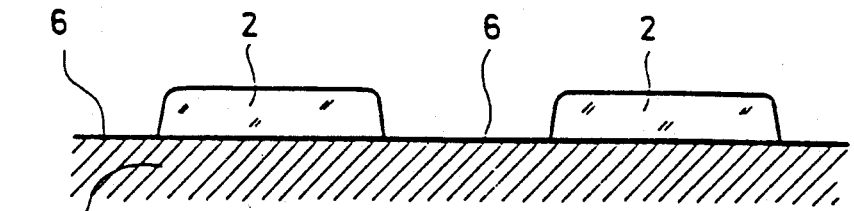
(2A)
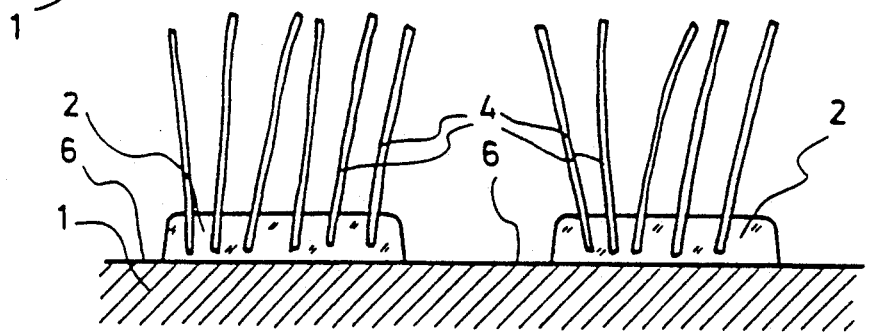
(2B)
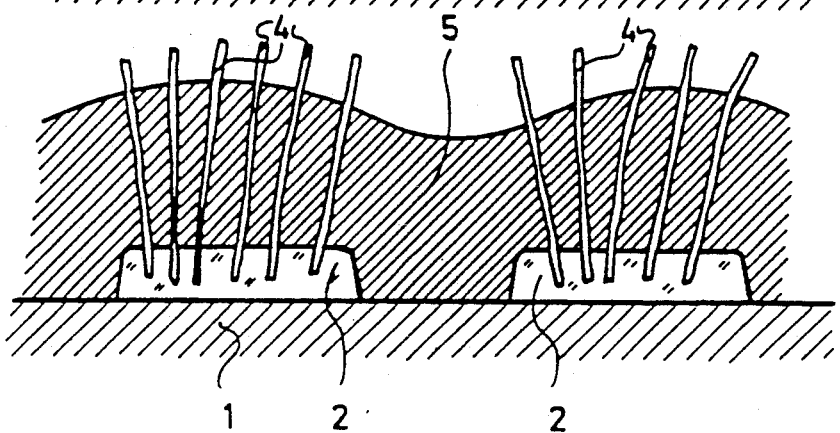
(2C)
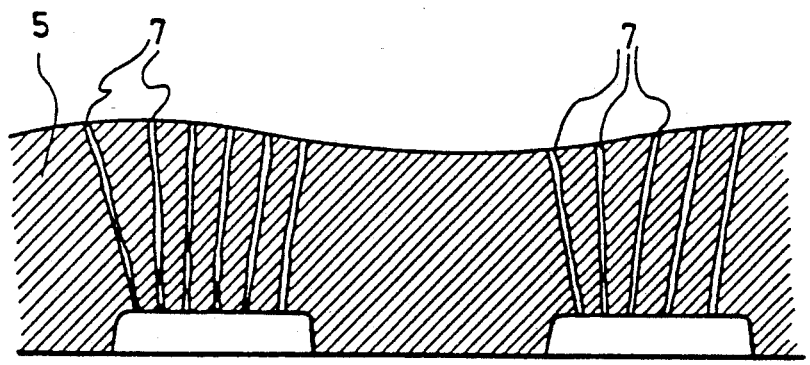
(2D)

METHOD OF PRODUCING A FILTER MATERIAL

FIELD OF THE INVENTION

The present invention refers to a method for producing a filter material comprising the steps of producing a continuous metallic layer, which is provided with microapertures, by means of electrodeposition of metal on a substrate from which the deposited metallic layer is later separated.

BACKGROUND OF THE INVENTION

Up to now, certain filter materials have been produced in the form of filter foils, either by electrodepositing metal on lithographically structured matrices, or by partially covering metal foils with resist films and etching them. With both methods, a decrease in the dimensions of the filter apertures necessitates a smaller thickness of the filter foils. As a general rule of thumb, the thickness of the foil cannot be much larger than the width of the filter apertures. As a result, in the case of very small apertures, e.g., less than 50 micrometers, the foils are so thin that they are difficult to manipulate and will no longer resist mechanical loads. An additional disadvantage of the known production methods is that the open filter area decreases markedly in the case of filters having small filter apertures. Moreover, there is a large variation in the aperture width of such filters having small filter apertures. For example, in the case of filter apertures as few as 10 micrometers, the aperture width tolerance may be a multiple of the nominal width. In cases where such wide variations in the aperture width are not permissible, the filter foils have to be produced by more complicated methods such as by a combination of X-ray lithography and galvanization.

SUMMARY OF THE INVENTION

The present invention relates to a method of producing a filter material and to the filter material produced by the described method. The method comprises the steps of providing a substrate and forming an electrically conductive structure on the substrate. Electrically insulating, fiber-like flock rods are then anchored to the substrate. A metal layer is then formed over the substrate and around the flock rods by electrodeposition. The completed filter is formed by separating the substrate from the electrodeposited metal layer and removing the flock rods from the electrodeposited metal layer to form the microapertures of the filter.

BRIEF DESCRIPTION OF THE DRAWINGS

These features and advantages of the invention, as well as other features and advantages of the invention, will be more apparent from following the detailed description of the invention presented in conjunction with the accompanying drawings in which:

FIG. 2 illustrates steps 2A to 2D for Example 2 describing the production of a filter material according to the present invention.

DETAILED DESCRIPTION

Figure 1:
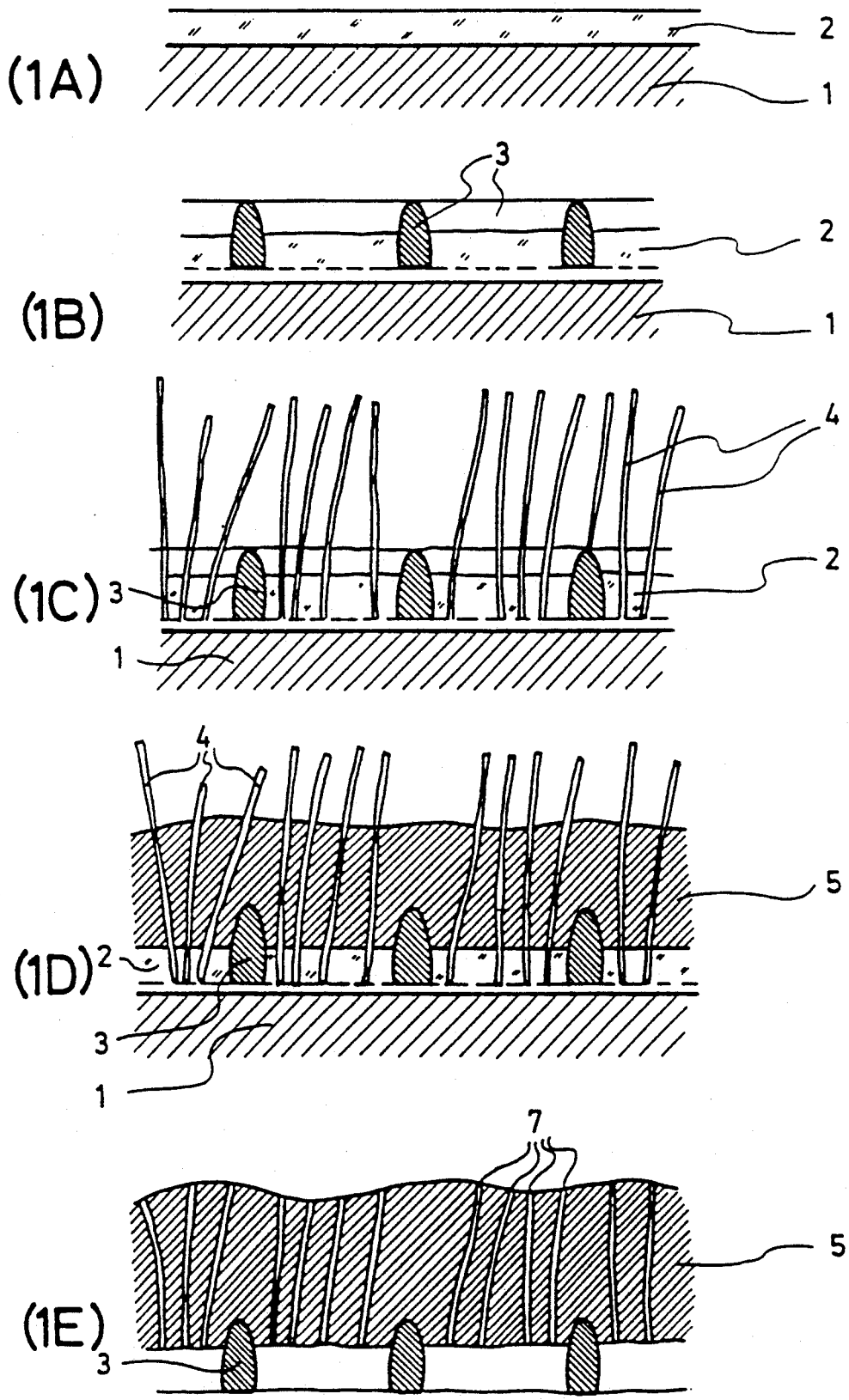
FIG. 1 illustrates steps 1A to 1E for Example 1 describing the production of a filter material according to the present invention.

The present invention relates to a metal foil filter material by a simple method which enables the production of a planar metal filter whose thickness can be comparatively large in relation to the width of the microapertures which also are formed in the filter material by the production method. The filter material so produced have relatively large open filter areas and the microapertures have comparatively small width tolerances.

Briefly, a substrate is coated with a layer of adhesive through which an electrically conductive structure extends. Electrically insulating and fiber-like flock rods, which act as electrical-insulation, are anchored in said layer of adhesive by flocking. The layer of adhesive is allowed to dry. After the adhesive is dry the flocked substrate has metal deposited thereon by electroplating. The electrically conductive structure is used as an electrode. The metallic layer thus produced is separated from the substrate, and the layer of adhesive, and the flock rods are removed from the metallic layer.

This method is simple and permits the production of a filter material which can have a thickness, which, in relation to the aperture width, can exceed that width by a factor of 10 to possibly 100. In view of the fact that the microapertures in the metal filter are determined by the diameter of the flock rods, the aperture width tolerance is comparatively small. The metal filter has formed therein long and thin filter channels whose widths vary within very close limits, said variations being less than 10 to 20% of the channel width.

The flocking of metal surfaces with flock rods has previously been used in other fields for reducing the thermal conductivity of metal surfaces, for example, so that touching these metal surfaces will be less unpleasant. Further examples are described in the article "Flor für anspruchsvolle Oberflächen" by U. Maag, Gomaringen, in "Metalloberfläche 45 (1991) 4", (special part of "Hanser-Fachzeitschriften", April 1991).

In one preferred embodiment of the present invention the electrically-conductive substrate used can be a metallic net, which, when the layer of adhesive has been applied to the substrate, is pressed into said layer of adhesive at least partially. The layer of adhesive which is effective with regard to the flocking process will then be located in the meshes of the metallic net. Although the webs of the metallic net will not be flocked in this way, the use of the metallic net still has the advantage of providing a regular electrically conductive substrate which results in the production of a uniform filter material.

In another preferred embodiment of the present invention, a substrate has an electrically-conductive material at least at its surface. A layer of adhesive is applied in a uniformly structured form, preferably by screen printing to the substrate in such a way that the surface of said substrate is covered by the adhesive only partially, the uncovered parts of substrate the surface forming the electrically conductive structure.

When an electrically conductive adhesive is used, the forms the electrically-conductive structure. The active filter area of the filter material is thus increased still further. Molten metal can be used for producing the layer of adhesive and heat-resistant fibers, e.g. glass-fiber sections, can be used for forming the flock rods. During the flocking process, the substrate is maintained above the melting temperature of the metal which is used as the adhesive.

A particularly preferred procedure in the practice of the method according to the present invention is the use of flock rods which can be washed out of the metallic layer by use of a solvent. The materials preferably used in such a procedure are e.g. viscose fibers, which can be dissolved by means of sulfuric acid, or non-crosslinked polymethamethyl acrylate, which can be dissolved in dichloromethane and glass fiber sections, which can be dissolved by hydrofluoric acid.

The methods of the invention produce a filter material consisting of a metallic layer produced by electrodeposition and provided with microapertures. The filter material is produced by embedding in the metallic layer a multitude of essentially parallel fibers which extend from one surface of the layer to the other surface thereof and which project beyond said layer on both sides. The embedded fibers are removed from the metallic layer forming the desired microapertures. It is thus possible to determine the thickness of the filter material essentially independently of the width of the microapertures. The width of the microapertures is essentially determined by the thickness of the individual fibers alone, whereby very small tolerance variations in the aperture width of the microapertures can be achieved.

EXAMPLE 1

The steps in the preparation of the filter material described in detail below are illustrated in FIG. 1. at 1A through 1E An aluminum sheet 1, which has a thickness of 3 mm and which is used as a substrate, is first provided with a layer of adhesive 2 having a thickness of approx. 25 to 30 micrometers. The adhesive used was a commercially available two-component adhesive housing a polyurethane base, which, after having been diluted with a solvent, was applied to the aluminum sheet with the aid of a spraying gun, as illustrated in step 1A.

As illustrated in step 1B, a metallic net 3 is pressed into the layer of adhesive 2 to such an extent that the upper part thereof projects above said layer of adhesive 2. The metallic net used in the case of the present example is a metallic net produced by electrodeposition, which has a hexagonal honeycomb structure having a thickness of 65 micrometers, an aperture width of 115 micrometers, a wall thickness of 60 micrometers, and an open area of approx. 50%. The material used for the metallic net is nickel.

As illustrated in step 1C, the thus-prepared substrate with the still-wet layer of adhesive is flocked with cut flock consisting of viscose fibers, which have a length of 0.3 mm and a diameter of 14 micrometers, with the aid of 50 kV high voltage in a manner known to those skilled in the art. In the course of this process, the individual flock rods are anchored in the layer of adhesive 2, within the openings of the metallic net 3.

After a drying period of 8 hours for the layer of adhesive, the flocked substrate 1 is immersed into a nickel sulfate galvanic bath as illustrated in step 1D, and the metallic net 3 is then connected as a cathode. At a temperature of 55° C. and a current density of A/dm$^2$, nickel is deposited on the substrate 1 for a period of 6 hours. The nickel layer 5 is grown on the metallic net 3 to close over the net, thus surrounding the flock rods. layer 5 is frown until an average thickness of approx. 150 micrometers has been reached; the flock rods still project beyond the metallic layer 5 at the top.

Subsequently, the metallic layer 5, is stripped off the aluminum sheet 1 together with the metallic net 3 embedded therein, the layer of adhesive 2 and the flock rods 4 adhering to the metallic layer 5 as it is removed. The metallic layer is immersed in 48% sulfuric acid at room temperature, and the layer of adhesive 2, as well as the flock rods 4, are dissolved in said sulfuric acid with ultrasonication for a period of 40 minutes.

The result obtained is a planar metal filter consisting of nickel, having an average thickness of approx. 150 micrometers. The metal filter includes, per mm$^2$ of surface area, an average of 202 continuous filter apertures 7 with a uniform diameter of 14 micrometers. This corresponds to an open filter area of approx. 3%, whereas a filter which is produced by electrodeposition in the conventional manner, and which has a thickness of 150 micrometers and an aperture width of 14 micrometers, would have an open filter area of only 0.15%. In order to obtain a filter having an open filter area of 3% and an aperture width of 14 micrometers by conventional production methods, the filter would have a maximum thickness of only 8 to 9 micrometers, and not suitable for manipulation or handling because of its fragility.

The metallic net 3, which is now partly embedded in the nickel layer 5, will normally not disturb the function of the filter and can be used as an additional supporting structure. If the metallic net should be undesirable, a material which differs from the material used for the filter can be chosen for the net, and the net can be removed by selective etching after completion of the steps described above. The metallic net may, for example, consist of copper and it may be etched away selectively with a copper chloride solution which leaves the nickel layer intact.

EXAMPLE 2

The steps of Example 2 are illustrated in FIG. 2 at 2A through 2D in which identical reference numerals are used for components which are identical or similar to those described in Example 1. In the following description, only the differences between FIG. 1 and FIG. 2 will be dealt with in detail.

As illustrated in FIG. 2A, instead of embedding a metallic net as an electrically conductive structure, the adhesive 2 is applied to the aluminum sheet 1 by screen printing. Strictly speaking, the layer of adhesive will then consist of circular islands of adhesive 2, which are surrounded by metallic, exposed areas 6 of the substrate.

As illustrated in steps 2B to 2D, the substrate 1 is flocked with flock rods 4, as described in Example 1, whereupon metal is electrodeposited on the exposed surface areas 6 of the substrate 1. The resultant metallic layer 5 is detached, and the flock rods 4 are chemically dissolved. In the case of this example, fibers consisting of non-crosslinked polymethamethyl acrylate (PMMA) are used as flock rods. These fibers are washed out of the metallic layer 5 with dichloromethane so that filter passages 7 of uniform diameter, which extend through the metal filter 5, are obtained.

EXAMPLE 3

Figure 3:
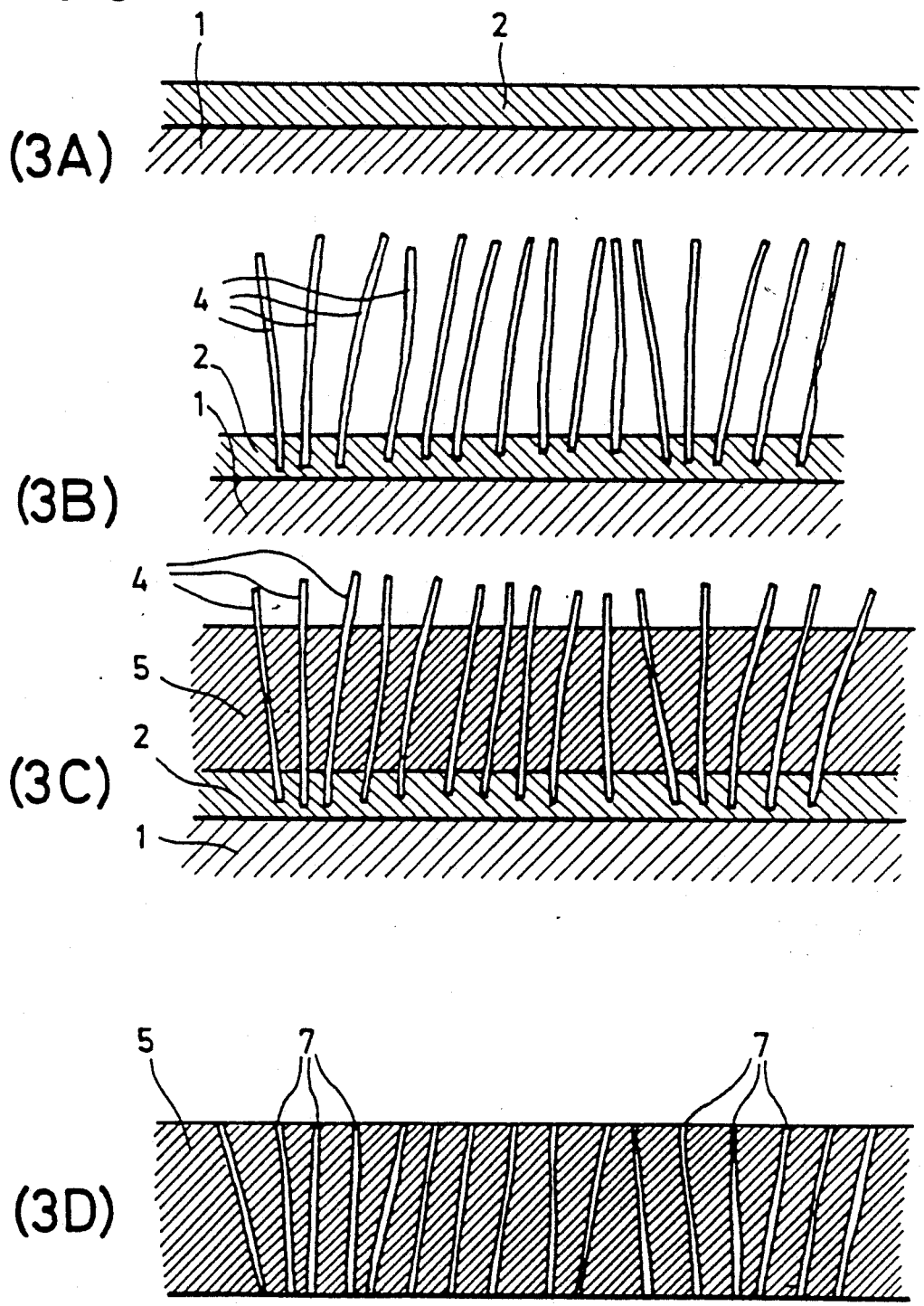
FIG. 3 illustrates steps 3A to 3D for Example 3 describing the production of filter material according to the present invention.

The method of Example 3 is illustrated in FIG. 3 in 3A through 3D in which, identical refererence numerals, to those of FIGS. 1 and 2, are used for components identical or similar to components used in FIGS. 1 and 2. Only the differences between FIG. 3 and FIGS. 1 or 2 are described in detail below.

An aluminum sheet 1 is immersed in molten tin so that, when the aluminum sheet 1 is removed from the molten tin, a thin layer 2 of tin will remain on the surface thereof, as illustrated in step 3A. Flocking, as illustrated in step 3B, is performed by maintaining the aluminum sheet at a temperature of approx. 240° C. which is above the melting temperature of the tin (232° C.). Glass-fiber sections 4, which will anchor in the molten tin 2, are used as the flock material. Subsequently, the substrate 1 is cooled down.

A nickel layer 5 is then deposited as described in Examples 1 and 2 and as illustrated in step 3C.

As illustrated in step 3D, the tin layer is removed, whereupon the glass fibers are washed out with hydrofluoric acid and ultrasonication. The filter material thus obtained is provided with filter channels uniformly throughout its whole area.

Instead of tin, it is just as possible to use other metals having a low melting point such as lead and zinc, for the layer of adhesive 2.

What is claimed is:

1. A method of producing a microaperture metallic layer filter material with a continuous metallic layer, which is provided with microapertures comprising the steps of:
   providing a substrate;
   forming an electrically conductive structure on the substrate to form a structured substrate;
   anchoring to the substrate electrically insulating and fibre-like flock rods;
   electrodepositing a metal layer directly onto the structured substrate and around the flock rods to thereby embed the flock rods in the metal layer;
   separating the substrate from the electrodeposited metal layer; and
   removing the flock rods from the electrodeposited metal layer to thereby form apertures through the metallic layer.

2. A method according to claim 1 wherein the electrically conductive structure is a metallic net, adhered to the substrate by an adhesive, and includes pressing the net into the adhesive.

3. A method according to claim 1 wherein the electrically conductive structure is formed by screen printing an insulating layer of adhesive over an electrical-conductive substrate.

4. A method according to claim 1 wherein the electrically conductive structure is formed by applying an electrically-conductive adhesive to the substrate.

5. A method according to claim 4 wherein the electrically-conductive adhesive is a layer of molten metal.

6. A method according to claim 1 wherein the flock rods are removed from the electrodeposited metal layer by dissolving them in a solvent.

7. A method for producing a microaperture metallic layer filter material comprising:
   providing a substrate;
   forming an electrically conductive structure over at least a portion of the surface of the substrate thus to provide a structured substrate;
   adhering a plurality of electrically nonconductive filaments of selected diameter to the structured substrate;
   forming directly on the structured substrate by electrodeposition a metallic layer wherein the filaments are embedded in such a manner that the filaments extend through the metallic layer;
   separating the metallic layer and the filaments from the substrate; and
   removing the filaments from the metallic layer to create passages of the selected diameter through the layer.

8. A microaperture metallic layer filter material comprising:
   a metallic layer; and
   microapertures through the metallic layer, wherein the thickness of the metallic layer can exceed the width of the apertures by a factor of 10 to 100 and wherein the aperture widths vary by less than 20%.

* * * * *

UNITED STATES PATENT AND TRADEMARK OFFICE
CERTIFICATE OF CORRECTION

PATENT NO. : 5,240,587
DATED : August 31, 1993
INVENTOR(S) : Asim Maner

It is certified that error appears in the above-indentified patent and that said Letters Patent is hereby corrected as shown below:

On the title page, item :

[56] References Cited, U.S. PATENT DOCUMENTS, insert the following reference:

-- 3,498,891  3/1970  Futterer --

Column 2, line 60, change "substrate the" to
            -- the substrate --.
Column 2, line 62, after "used," change "the" to -- it --.

Column 3, line 30, after "FIG. 1" delete the period.
Column 3, line 31, after "1E" insert a period.
Column 3, line 50, after "substrate" insert -- 1 --.
Column 3, line 66, change "frown" to -- grown --.

Column 4, line 64, change "refererence" to
            -- reference --.

Signed and Sealed this

Twenty-eighth Day of June, 1994

Attest:

BRUCE LEHMAN

*Attesting Officer*     *Commissioner of Patents and Trademarks*